(12) United States Patent
Zhou

(10) Patent No.: US 8,390,434 B2
(45) Date of Patent: Mar. 5, 2013

(54) POWER CONTROLLER

(75) Inventor: Hai-Qing Zhou, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 561 days.

(21) Appl. No.: 12/752,146

(22) Filed: Apr. 1, 2010

(65) Prior Publication Data

US 2011/0169618 A1    Jul. 14, 2011

(30) Foreign Application Priority Data

Jan. 11, 2010  (CN) .......................... 2010 1 0300178

(51) Int. Cl.
*G05B 19/02*    (2006.01)

(52) U.S. Cl. ..................... 340/12.22; 340/4.3; 340/5.61; 340/12.32

(58) Field of Classification Search .... 340/12.22–12.29, 340/12.31–12.34, 4.11–4.14, 4.3–4.34, 12.8, 340/5.6, 5.61; 307/117
See application file for complete search history.

(56) References Cited

FOREIGN PATENT DOCUMENTS

CN           2791775 Y        6/2006

*Primary Examiner* — Nabil Syed
(74) *Attorney, Agent, or Firm* — Altis Law Group, Inc.

(57) ABSTRACT

A power controller includes an infrared emitting circuit, an infrared receiving circuit, and a switching circuit. The infrared emitting circuit emits an infrared signal received by the infrared receiving circuit which outputs a corresponding control signal. The switching circuit is connected to the infrared receiving circuit to receive the control signal, and is connected to a powering control terminal of a motherboard of a computer to output a pulse signal to turn the computer on and off according to the control signal.

4 Claims, 3 Drawing Sheets

POWER CONTROLLER

BACKGROUND

1. Technical Field

The present disclosure relates to a power controller for a computer.

2. Description of Related Art

A controller for turning a computer on and off is usually disposed on a bezel of a computer chassis. When the chassis is placed under a desk, using the controller to turn the computer on and off can be inconvenient.

DETAILED DESCRIPTION

Figure 1:
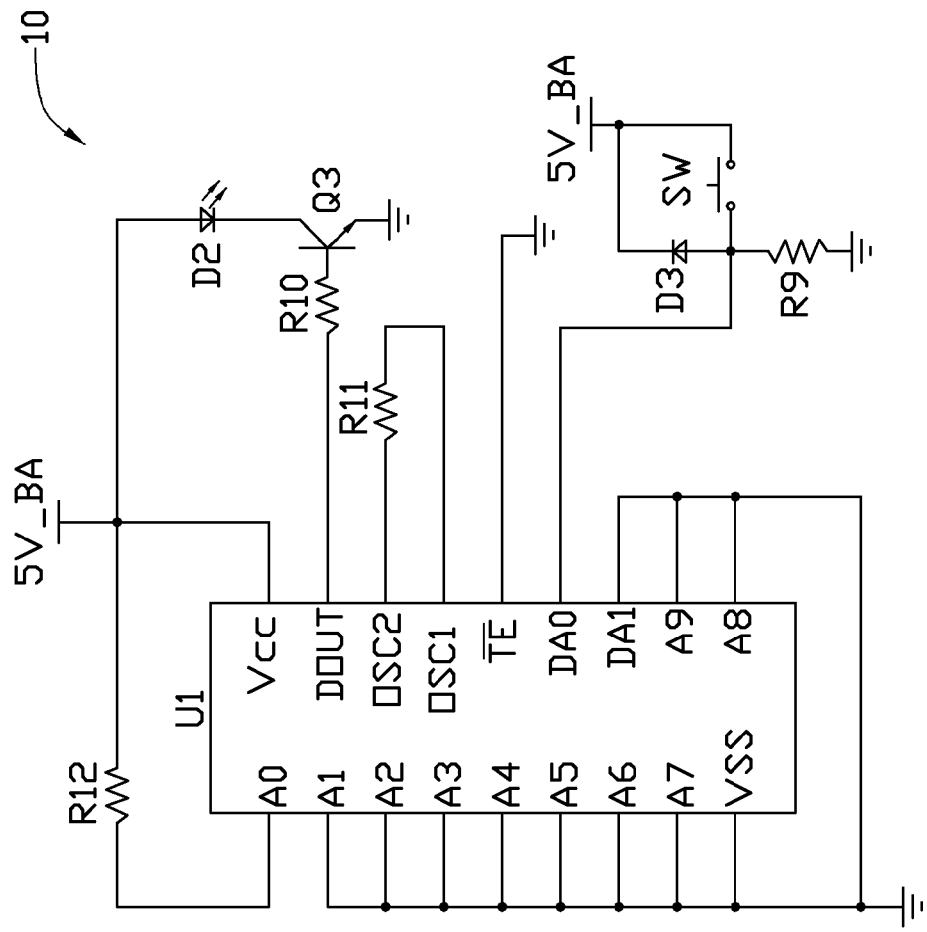
FIG. 1 is a circuit diagram of an infrared emitting circuit of an exemplary embodiment of a power controller.
Figure 2:
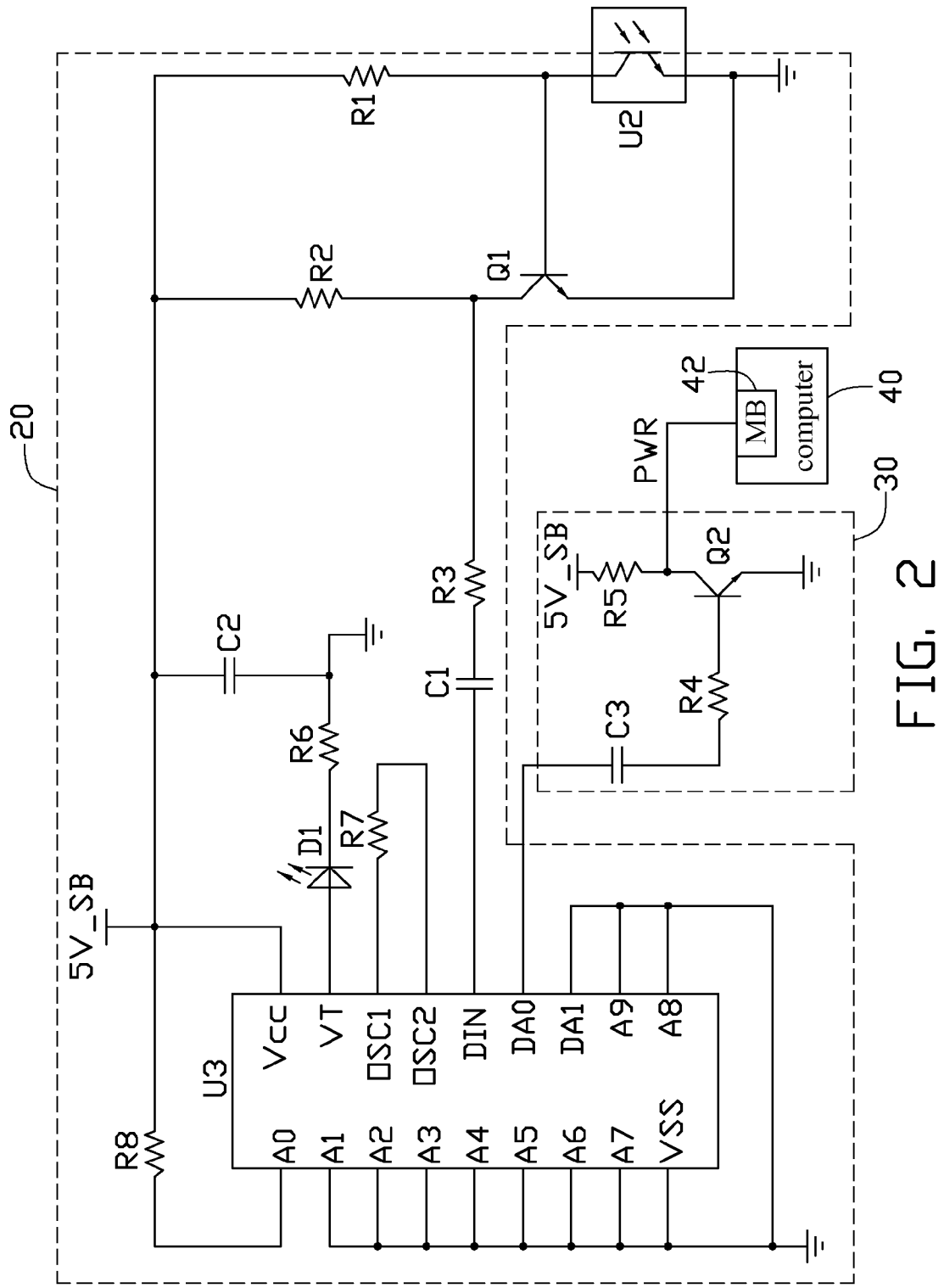
FIG. 2 is a circuit diagram of an infrared receiving circuit and a switching circuit of the power controller of FIG. 1, in accordance with an embodiment.

Referring to FIGS. 1 and 2, an embodiment of a power controller, to turn a computer 40 on and off, includes an infrared emitting circuit 10, an infrared receiving circuit 20, and a switching circuit 30.

The infrared emitting circuit 10 includes an encoder U1, a switch SW, an npn transistor Q3, and a light-emitting diode (LED) D2. The type of the encoder U1 may be PT2262. The encoder U1 includes ten address terminals A0-A9, two input terminals DA0 and DA1, an output terminal DOUT, an oscillation input terminal OSC1, an oscillation output terminal OSC2, an enable terminal $\overline{TE}$, a power terminal $V_{cc}$, and a ground terminal $V_{ss}$. The address terminals A1-A9 are grounded, the address terminals A0 is connected to a standby power supply 5V_BA via a resistor R12. The power terminal $V_{cc}$ is connected to the standby power supply 5V_BA. The input terminal DA0 is connected to a first terminal of the switch SW and grounded via a resistor R9, the input terminal DA1 is grounded. The enable terminal $\overline{TE}$ and the ground terminal $V_{ss}$ are grounded. The output terminal DOUT is connected to a base of the transistor Q3 via a resistor R10. The oscillation input terminal OSC1 is connected to the oscillation output terminal OSC2 via a resistor R11. A second terminal of the switch SW is connected to the standby power supply 5V_BA. An emitter of the transistor Q3 is grounded, and a collector of the transistor Q3 is connected to a cathode of the LED D2. An anode of the LED D2 is connected to the standby power supply 5V_BA. The switch SW is normally open. The standby power supply 5V_BA may be a battery.

The infrared receiving circuit 20 includes an infrared receiver U2, an npn transistor Q1, a decoder U3, and an LED D1. A first terminal of the infrared receiver U2 is operable to receive infrared signals, a second terminal of the infrared receiver U2 is grounded, a third terminal of the infrared receiver U2 is connected to a base of the transistor Q1 and connected to a standby power supply 5V_SB via a resistor R1. An emitter of the transistor Q1 is grounded. A collector of the transistor Q1 is connected to the standby power supply 5V_SB via a resistor R2. The type of the decoder U3 may be PT2272. The decoder U3 includes ten address terminals A0-A9, an input terminal DIN, two output terminals DA0 and DA1, an oscillation input terminal OSC1, an oscillation output terminal OSC2, a decoding available terminal VT, a ground terminal $V_{ss}$, and a power terminal $V_{cc}$. The address terminal A0 of the decoder U3 is connected to the standby power supply 5V_SB via a resistor R8, the address terminals A1-A9 of the decoder U3 are grounded. The input terminal DIN of the decoder U3 is connected to the collector of the transistor Q1 via a capacitor C1 and a resistor R3 in series. The output terminal DA0 of the decoder U3 is connected to the switching circuit 30, the output terminal DA1 of the decoder U3 is grounded. The oscillation input terminal OSC1 is connected to the oscillation output terminal OSC2 of the decoder U3 via a resistor R7. The power terminal $V_{cc}$ of the decoder U3 is connected to the standby power supply 5V_SB and grounded via a capacitor C2. The ground terminal $V_{ss}$ of the decoder U3 is grounded. The decoding available terminal VT of the decoder U3 is connected to an anode of the LED D1, a cathode of the LED D1 is grounded via a resistor R6. The standby power supply 5V_SB may be from a motherboard (MB) 42 of the computer 40. In other embodiments, the capacitors C1 and C2, the resistor R3, and the LED D1 may be omitted, and the encoder U1 and the decoder U3 replaced with other types of encoder and decoder.

The switching circuit 30 includes an npn transistor Q2. A base of the transistor Q2 is connected to the output terminal DA0 of the decoder U3 via a resistor R4 and a capacitor C3 in series, an emitter of the transistor Q2 is grounded, a collector of the transistor Q2 is connected to the standby power supply 5V_SB via a resistor R5, and operable to connect to a powering control terminal PWR of the MB 42 of the computer 40. In other embodiments, the transistors Q1-Q3 may be replaced of other types of electrical switches, such as n-channel enhanced field-effect transistors.

Figure 3:
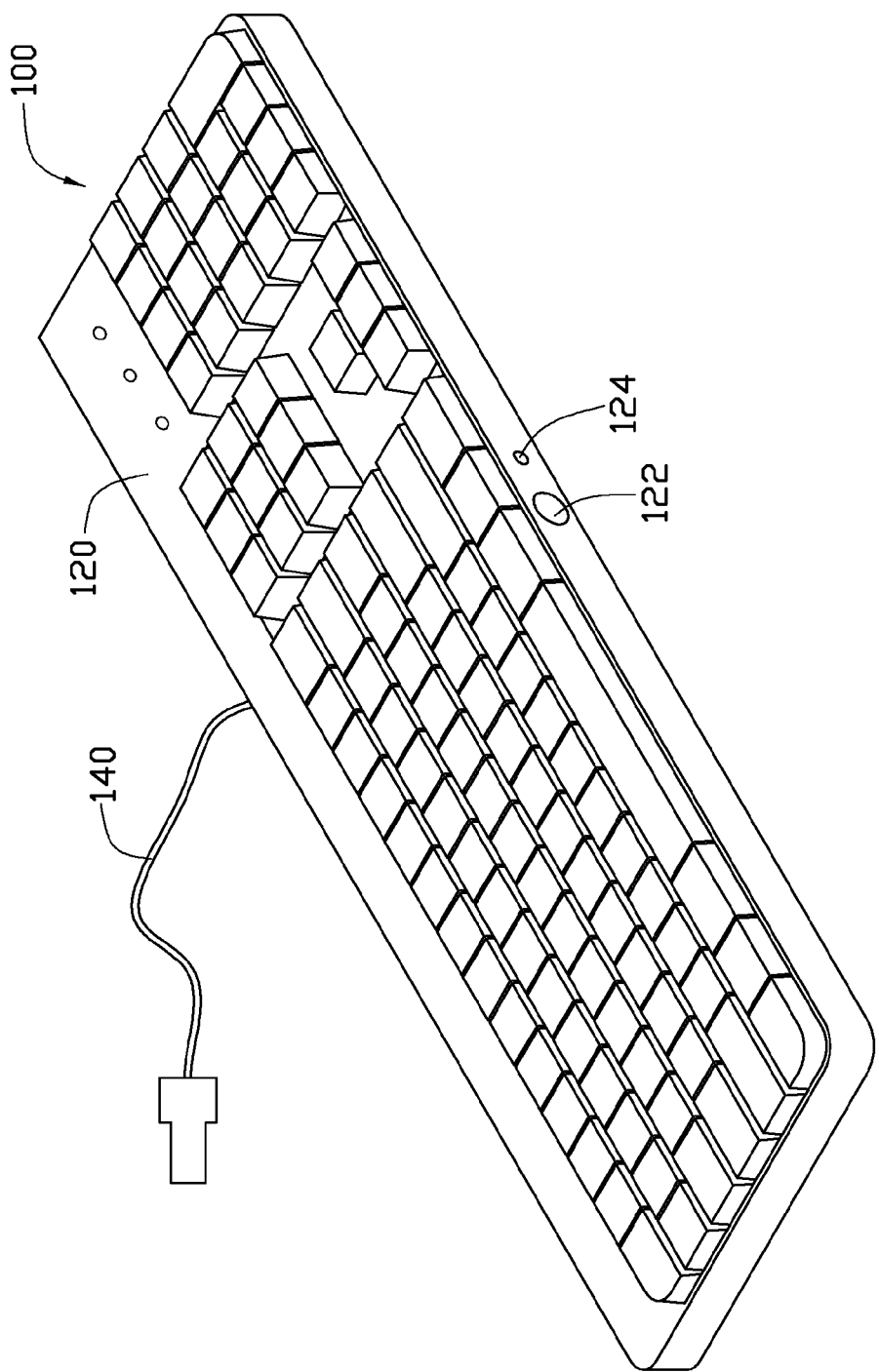
FIG. 3 is an isometric view of a keyboard combined with the power controller of the embodiment.

Referring to FIG. 3, the power controller may be utilized in a keyboard 100. The keyboard 100 includes a case 120. The infrared receiving circuit 20 and switching circuit 30 are set in the case 120. The case 120 defines two through holes 122 and 124 for exposing the infrared receiver U2 and the LED D1. The collector of the transistor Q2 is operable to be connected to the powering control terminal PWR through an idle pin of a connector of the keyboard 100. In other embodiments, the power controller may be utilized in another computer 40 peripheral device, such as a mouse.

In use, when the computer 40 is to be powered off, the switch SW is closed for a period of time T0. During the time T0, the input terminal DA0 of the encoder U1 is at high voltage level, the output terminal DOUT of the encoder U1 outputs a high voltage, thereby the transistor Q3 is turned on, the LED D2 sends an infrared signal to the infrared receiver U2, the first terminal of the infrared receiver U2 receives the infrared signal, the infrared receiver U2 is turned on, the third terminal of the infrared receiver U2 is at low voltage level, the transistor Q1 is turned off, the collector of the transistor Q1 is at high voltage level, the input terminal DIN of the decoder U3 receives a high voltage. Because the address terminals A0-A9 of the decoder U3 respectively have the same voltage level to the address terminals A0-A9 of the encoder U1, the decoding available terminal VT of the decoder U3 outputs a high voltage, the LED D1 emits light indicating that the infrared signal is decoded successfully. Therefore, the output terminal DA0 of the decoder U3 outputs a pulse signal at high voltage level. The base of the transistor Q2 receives the pulse signal, the transistor Q2 is turned on, the collector of the transistor Q2 outputs a control signal at low voltage level, the powering control terminal PWR of the MB 42 of the computer 40 receives the control signal and remains at low voltage level for the period of time T0, the computer 40 is powered off.

Similarly, when the computer 40 is working and the switch SW is closed for a period of time T1, the powering control terminal PWR remains low voltage for the period of time T1, the computer 40 is powered off. Because the time needed to power on the computer 40 by pressing a power-on button on a bezel of a chassis of the computer 40 is commonly greater than that needed to power off the computer 40, T1 should exceed T0.

It is to be understood, however, that even though numerous characteristics and advantages of the present disclosure have been set forth in the foregoing description, together with details of the structure and function of the disclosure, the disclosure is illustrative only, and changes may be made in details, especially in matters of shape, size, and arrangement of parts within the principles of the disclosure to the full extent indicated by the broad general meaning of the terms in which the appended claims are expressed.

What is claimed is:

1. A power control system for a computer, the power control system comprising:
    an infrared emitting circuit to emit an infrared signal;
    an infrared receiving circuit to receive the infrared signal and output a control signal corresponding to the infrared signal;
    a switching circuit connected to the infrared receiving circuit to receive the control signal, and output a pulse signal to power on or power off the computer according to the control signal,
    wherein the infrared receiving circuit comprises:
    an infrared receiver comprising a first terminal to receive the infrared signal, a grounded second terminal, and a third terminal connected to a first standby power supply via a first resistor, wherein the second and third terminals are connected when the first terminal receives the infrared signal;
    a first electrical switch comprising a first terminal connected to the third terminal of the infrared receiver, a grounded second terminal, and a third terminal connected to the first standby power supply via a second resistor; wherein the second and third terminals of the first electrical switch are connected when the first terminal of the electrical switch is at high voltage level; and
    a decoder comprising an input terminal and an output terminal, wherein the input terminal is connected to the third terminal of the first electrical switch, and the output terminal is connected to the switching circuit to output the control signal;
    wherein the switching circuit comprises a second electrical switch, the second electrical switch comprises first to third terminals, wherein the first terminal is connected to the output terminal of the decoder via a third resistor and a second capacitor in series to receive the control signal, the second terminal is grounded, and the third terminal is connected to the first standby power supply via a fourth resistor to output the pulse signal.

2. The power control system of claim 1, wherein the input terminal of the decoder is connected to the third terminal of the first electrical switch via a first capacitor and a third resistor in series.

3. The power control system of claim 1, wherein the infrared emitting circuit comprises:
    a light-emitting diode (LED) to emit the infrared signal to the infrared receiver;
    a third electrical switch comprising first to third terminals, wherein the second terminal of the third electrical switch is grounded, the third terminal of the third electrical switch is connected to a cathode of the LED, an anode of the LED is connected to a second standby power supply, and the second and third terminals of the third electrical switch are connected when the first terminal is at high voltage level;
    a switch comprising a first terminal and a second terminal; and
    an encoder comprising an input terminal connected to the first terminal of the switch and grounded via a fifth resistor, and an output terminal connected to the first terminal of the third electrical switch via a sixth resistor; wherein the second terminal of the switch is connected to the second standby power supply.

4. The power control system of claim 1, wherein the first to third electrical switches are npn transistors, and the first to third terminals of each transistor are a base, an emitter, and a collector of the transistor.

* * * * *